US012621180B2

(12) United States Patent
Subramanian et al.

(10) Patent No.: US 12,621,180 B2
(45) Date of Patent: *May 5, 2026

(54) FINE-GRAINED SD-WAN OPTIMIZATION SERVICES FOR CLOUD-NATIVE APPLICATIONS

(71) Applicant: Cisco Technology, Inc., San Jose, CA (US)

(72) Inventors: Sridhar Subramanian, Fremont, CA (US); Fabio Rodolfo Maino, Palo Alto, CA (US); Alberto Rodriguez Natal, Mountain View, CA (US); Vijoy Anand Pandey, San Jose, CA (US); Edward A. Warnicke, Austin, TX (US); John Andrew Joyce, Nashua, NH (US); Timothy James Swanson, Westford, MA (US); Loránd Jakab, sat Gheorghieni (RO)

( * ) Notice: Subject to any disclaimer, the term of this patent is extended or adjusted under 35 U.S.C. 154(b) by 0 days.

This patent is subject to a terminal disclaimer.

(21) Appl. No.: 18/139,449

(22) Filed: Apr. 26, 2023

(65) Prior Publication Data
US 2023/0261999 A1      Aug. 17, 2023

Related U.S. Application Data

(63) Continuation of application No. 16/983,346, filed on Aug. 3, 2020, now Pat. No. 11,665,095.
(Continued)

(51) Int. Cl.
*H04L 12/28*          (2006.01)
*H04L 41/00*          (2022.01)
(Continued)

(52) U.S. Cl.
CPC .......... *H04L 12/2803* (2013.01); *H04L 12/28* (2013.01); *H04L 41/0894* (2022.05);
(Continued)

(58) Field of Classification Search
CPC ..... H04L 67/10; H04L 45/38; H04L 41/0893; H04L 12/2803; H04L 67/14; H04L 47/20;
(Continued)

(56) References Cited

U.S. PATENT DOCUMENTS

| | | | |
|---|---|---|---|
| 10,212,041 B1 * | 2/2019 | Rastogi ................... | H04L 43/20 |
| 10,999,326 B1 * | 5/2021 | Pollitt ..................... | H04L 63/20 |
| (Continued) | | | |

FOREIGN PATENT DOCUMENTS

CN          110704164 A          1/2020

OTHER PUBLICATIONS

Venkatesh, P., "Enabling Intelligent Branch with SD-WAN and Kubernetes", online: https://www.onug.net/blog/enabling-intelligent-branch-with-sd-wan-and-kubernetes/, Oct. 2018 [printed May 2020], 11 pages, ONUG.net.

(Continued)

*Primary Examiner* — Cheikh T Ndiaye
(74) *Attorney, Agent, or Firm* — Lee & Hayes, P.C.

(57)          ABSTRACT

In one embodiment, a device of a software-defined wide area network (SD-WAN) receives, from a cloud-native application, contextual data for the cloud-native application that identifies microservices of the cloud-native application. The device translates the contextual data for the cloud-native application into a network policy for traffic in the SD-WAN associated with the cloud-native application. The device applies the network policy to a traffic flow in the SD-WAN between an endpoint and a particular microservice of the cloud-native application.

20 Claims, 8 Drawing Sheets

Related U.S. Application Data

(60) Provisional application No. 62/979,807, filed on Feb. 21, 2020.

(51) Int. Cl.

| | |
|---|---|
| *H04L 41/0894* | (2022.01) |
| *H04L 41/0895* | (2022.01) |
| *H04L 45/50* | (2022.01) |
| *H04L 47/20* | (2022.01) |
| *H04L 67/02* | (2022.01) |
| *H04L 67/10* | (2022.01) |
| *H04L 67/12* | (2022.01) |
| *H04L 67/14* | (2022.01) |
| *H04L 69/16* | (2022.01) |
| *H04L 41/40* | (2022.01) |

(52) U.S. Cl.
CPC .......... *H04L 41/0895* (2022.05); *H04L 41/20* (2013.01); *H04L 45/50* (2013.01); *H04L 47/20* (2013.01); *H04L 67/02* (2013.01); *H04L 67/10* (2013.01); *H04L 67/12* (2013.01); *H04L 67/14* (2013.01); *H04L 69/16* (2013.01); *H04L 41/40* (2022.05)

(58) Field of Classification Search
CPC ......... H04L 67/02; H04L 45/64; H04L 45/50; H04L 12/28; H04L 69/16; H04L 41/20; H04L 41/5019; H04L 41/5096
See application file for complete search history.

(56) References Cited

U.S. PATENT DOCUMENTS

| | | | |
|---|---|---|---|
| 11,032,389 B1 | 6/2021 | Chaubey et al. | |
| 2009/0055888 A1 | 2/2009 | Little | |
| 2016/0164826 A1 | 6/2016 | Riedel et al. | |
| 2016/0308905 A1* | 10/2016 | Stiekes | H04L 63/08 |
| 2017/0230467 A1 | 8/2017 | Salgueiro et al. | |
| 2019/0036814 A1* | 1/2019 | Aranha | H04L 45/64 |
| 2019/0394286 A1* | 12/2019 | Chunduru Venkata | H04L 41/5048 |

| | | | |
|---|---|---|---|
| 2020/0012483 A1 | 1/2020 | Nassaur | |
| 2020/0112487 A1 | 4/2020 | Inamdar et al. | |
| 2020/0322262 A1 | 10/2020 | Maino et al. | |
| 2020/0366574 A1* | 11/2020 | Schubert | H04L 41/5032 |
| 2020/0366697 A1* | 11/2020 | Vittal | G06F 21/62 |
| 2020/0366759 A1* | 11/2020 | Sinha | H04L 41/40 |
| 2020/0396141 A1 | 12/2020 | Sundararajan et al. | |
| 2020/0413283 A1 | 12/2020 | Shen et al. | |
| 2021/0204091 A1* | 7/2021 | Schubert | H04L 41/5051 |
| 2022/0029921 A1 | 1/2022 | Rodriguez-Natal et al. | |

OTHER PUBLICATIONS

Wilkins, Sean, "Policy Based Routing (PBR) Fundamentals", Aug. 2010, 5 pages, Pluralsight LLC.

Yaguache, et al., "Containerized Services Orchestration for Edge Computing in Software-Defined Wide Area Networks", International Journal of Computer Networks & Communications (IJCNC) vol. 11, No. 5, Sep. 2019, pp. 113-132.

"Kubernetes", online: https://en.wikipedia.org/wiki/Kubernetes, 9 pages, May 2020, Wikimedia Foundation, Inc.

"What is Istio?", online: https://istio.io/docs/concepts/what-is-istio/, May 2020, 3 pages, Istio Authors.

Sun, Yuqiong, "Security-as-a-Servive for Microservices-Based Cloud Applications", 2015 IEEE 7th International Conference on Cloud Computing Technology and Science (Cloudcom), Iee, Nov. 30, 2015, pp. 50-57, XPO32859051.

International Search Report issued on Apr. 16, 2021 in connection with International Patent Application No. PCT/US2021/016694.

Apostolopoulos J., et al., "Cloud-Native SD-WAN: The WAN Your Kubernetes Applications Deserve," Published Aug. 20, 2020, 08 pages, Retrieved from URL: https://blogs.cisco.com/networking/introducing-the-cloud-native-sd-wan-project.

International Search Report and Written Opinion for International Application No. PCT/US2022/016607, mailed May 19, 2022, 19 Pages.

SunSince90: "Service Registry," Published Jan. 22, 2021, 05 pages, [Retrieved on Apr. 20, 2021] from GitHub.

Tato G., "Lazy and Locality-Aware Building Blocks for Fog Middleware: A Service Discovery Use Case," published May 12, 2020, 126 pages, Retrieved from URL: https://tel.archives-ouvertes.fr.

* cited by examiner

FINE-GRAINED SD-WAN OPTIMIZATION SERVICES FOR CLOUD-NATIVE APPLICATIONS

RELATED APPLICATION

This application is a continuation of U.S. patent application Ser. No. 16/983,346, filed on Aug. 3, 2020, and claims priority to U.S. Provisional Patent Application No. 62/979,807, filed on Feb. 21, 2020, both entitled "FINE-GRAINED SD-WAN OPTIMIZATION SERVICES FOR CLOUD-NATIVE APPLICATIONS" by Subramanian et al., the contents of which are incorporated by reference herein.

TECHNICAL FIELD

The present disclosure relates generally to computer networks, and, more particularly, fine-grained software-defined wide area network (SD-WAN) optimization services for cloud-native applications.

BACKGROUND

Software defined networking (SDN) represents an evolution of computer networks away from a decentralized architecture to one of centralized, software-based control. More specifically, in traditional computer networks, the control plane (e.g., selection of the routing path) and the data plane (e.g., forwarding packets along the selected path) are intertwined, with control plane decisions being made in a decentralized manner via signaling between the networking devices. In contrast, control plane decisions in an SDN-based network architecture are made by a centralized controller and pushed to the networking devices, as needed. For example, a software-defined wide area network (SD-WAN) represents one potential implementation of an SDN that can be used to connect a local client device to a remote, cloud-based application/service.

The cloud-native paradigm is shifting the way applications are developed, deployed, and operated. Applications are now decomposed into a collection of microservices that interconnect via Layer 7 (L7) protocols, such as via Hypertext Transfer Protocol (HTTP) or HTTP Secure (e.g. HTTPS), and are deployed leveraging infrastructure components such as container orchestrators (e.g. Kubernetes), service meshes (e.g. Istio), and policy enforcement points (e.g. Envoy). This cloud-native infrastructure is meant to enable policy, telemetry, traffic engineering, etc., to optimize the operation of cloud-native applications.

One of the main forces that is driving the evolution of applications into microservices is the increased efficiency in allocating computing resources in both public and hybrid clouds. Containerization, in fact, offers a smaller granularity with which computing resources can be allocated to an application. At the same time, computing resources can be allocated elastically to cloud native applications, scaling horizontally as the demands of the application change over time. This, ultimately, increases the efficiency of resource utilization by the cloud service provider.

Figure 6:
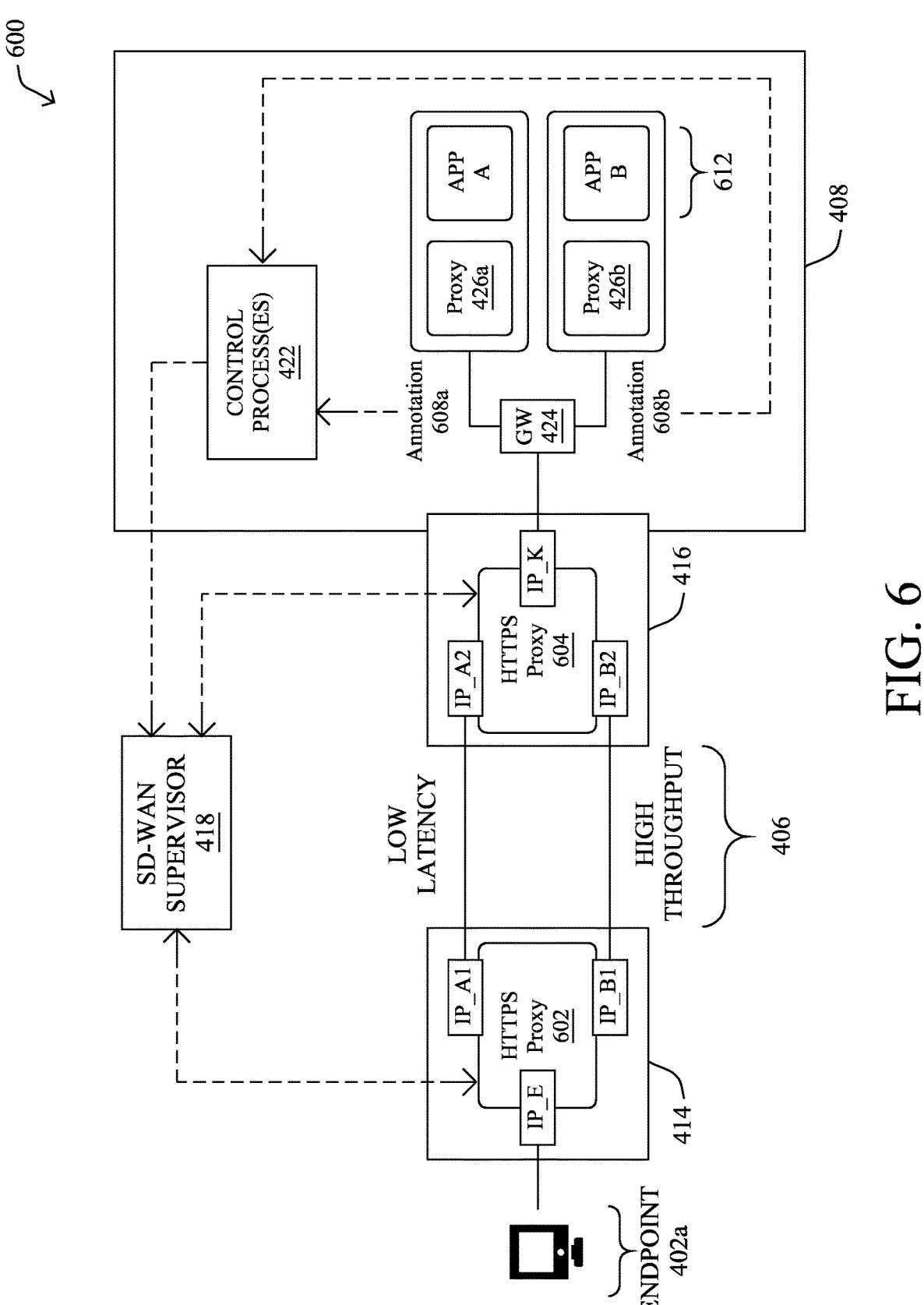
Figure 7:
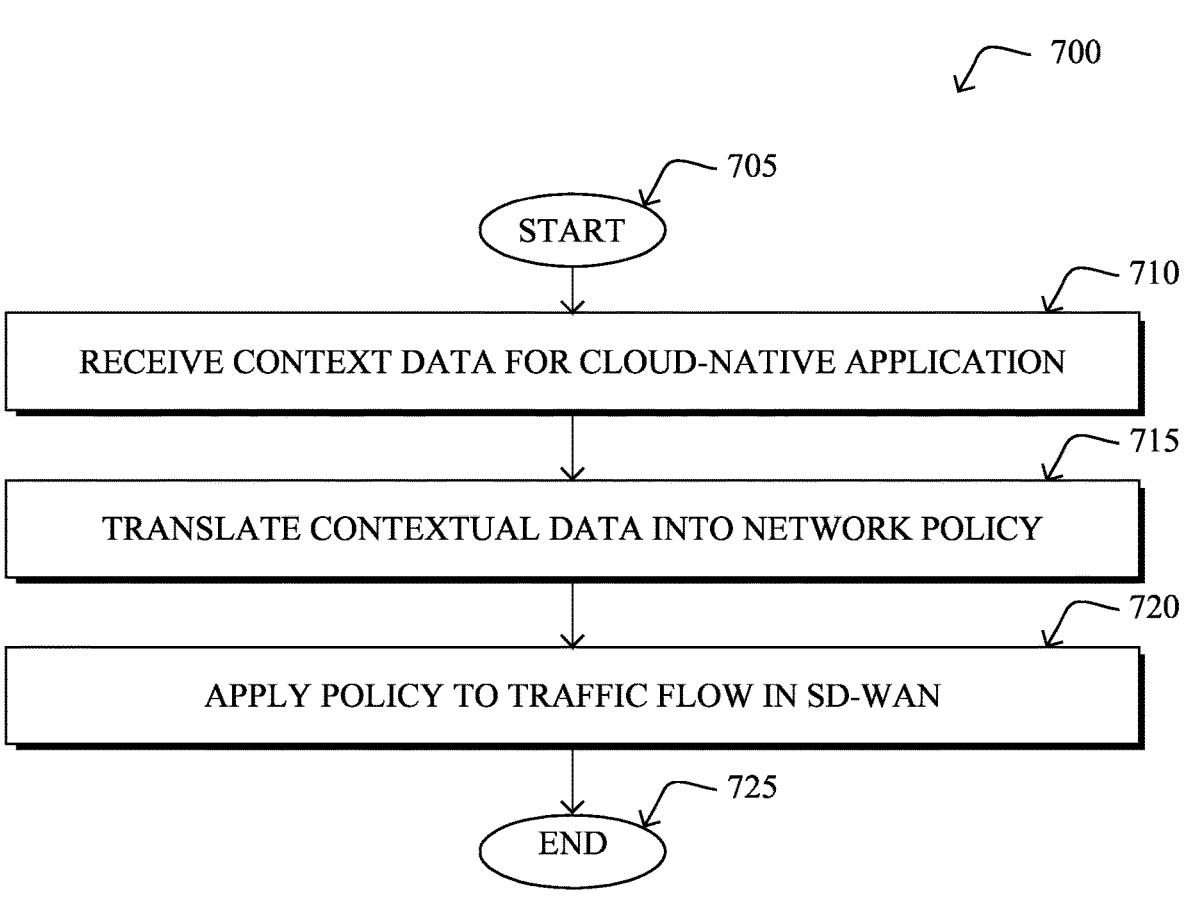

FIG. illustrates another example architecture for providing fine-grained access control for cloud-native application microservices;

FIG. 6 illustrates an example architecture for passing contextual data to an SD-WAN; and FIG. 7 illustrates an example simplified procedure for translating contextual data for a cloud-native application into a network policy.

DESCRIPTION OF EXAMPLE EMBODIMENTS

Overview

According to one or more embodiments of the disclosure, a device of a software-defined wide area network (SD-WAN) receives, from a cloud-native application, contextual data for the cloud-native application that identifies microservices of the cloud-native application. The device translates the contextual data for the cloud-native application into a network policy for traffic in the SD-WAN associated with the cloud-native application. The device applies the network policy to a traffic flow in the SD-WAN between an endpoint and a particular microservice of the cloud-native application.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
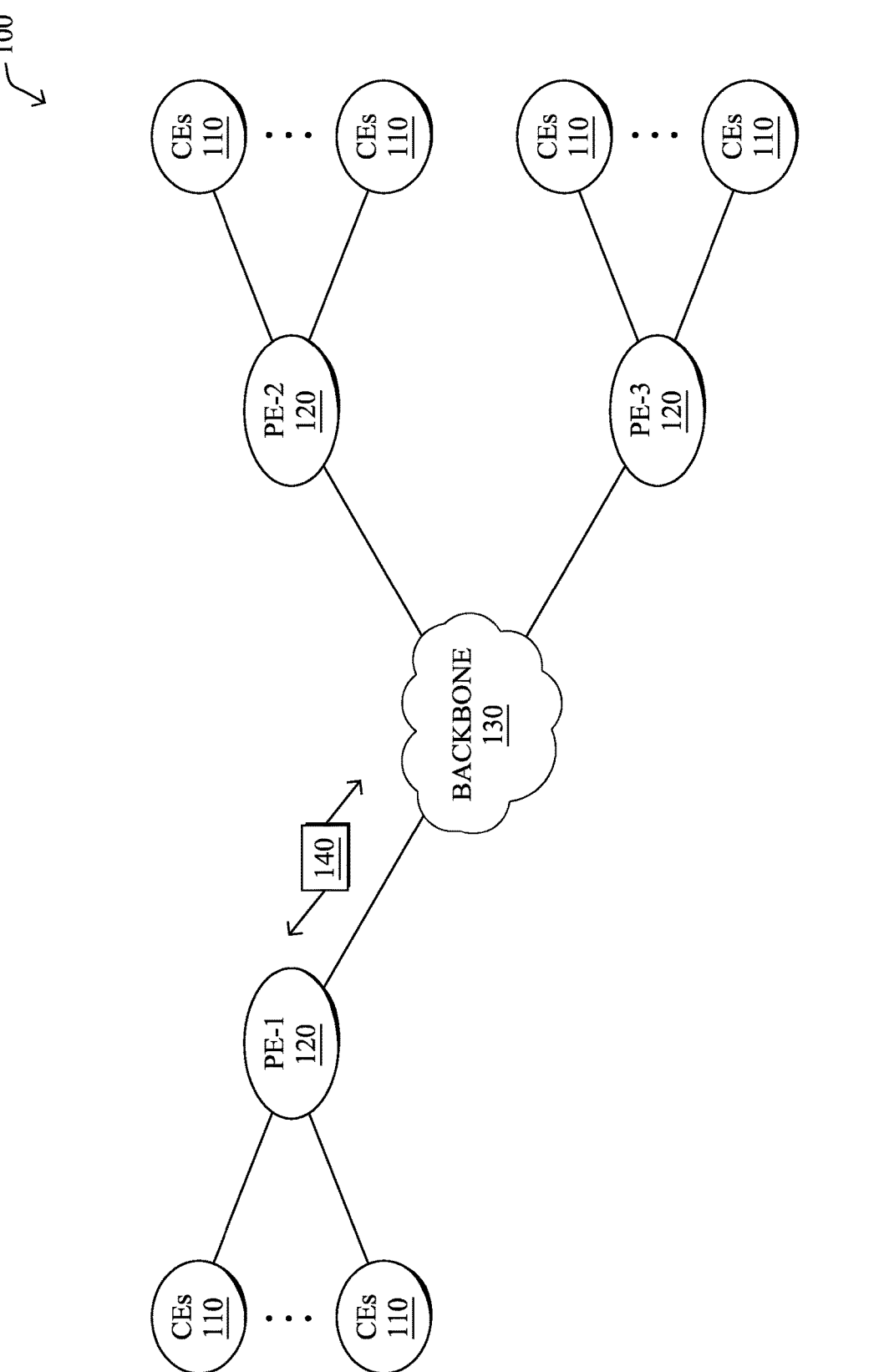
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
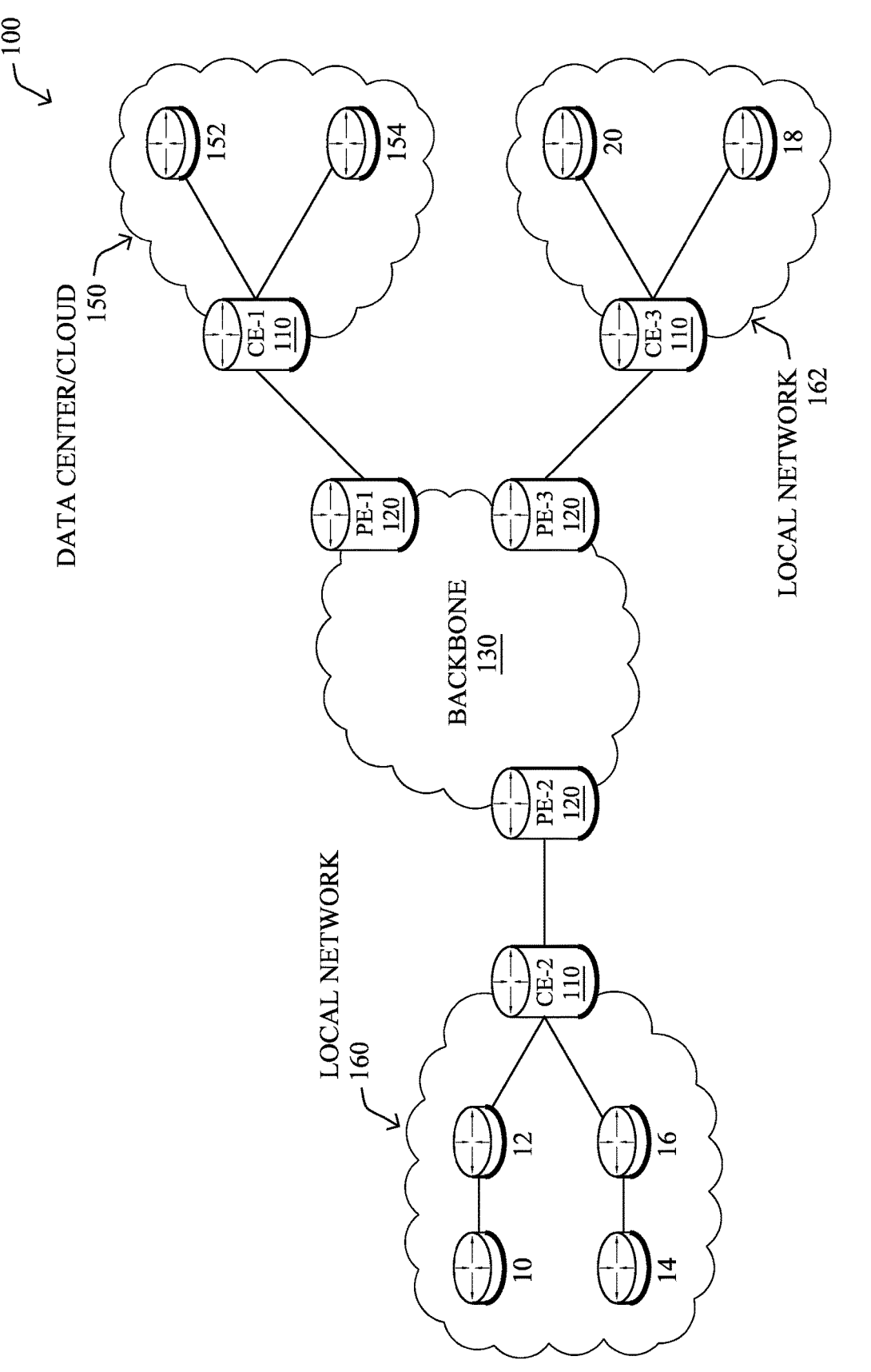

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local/branch networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, branch/local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
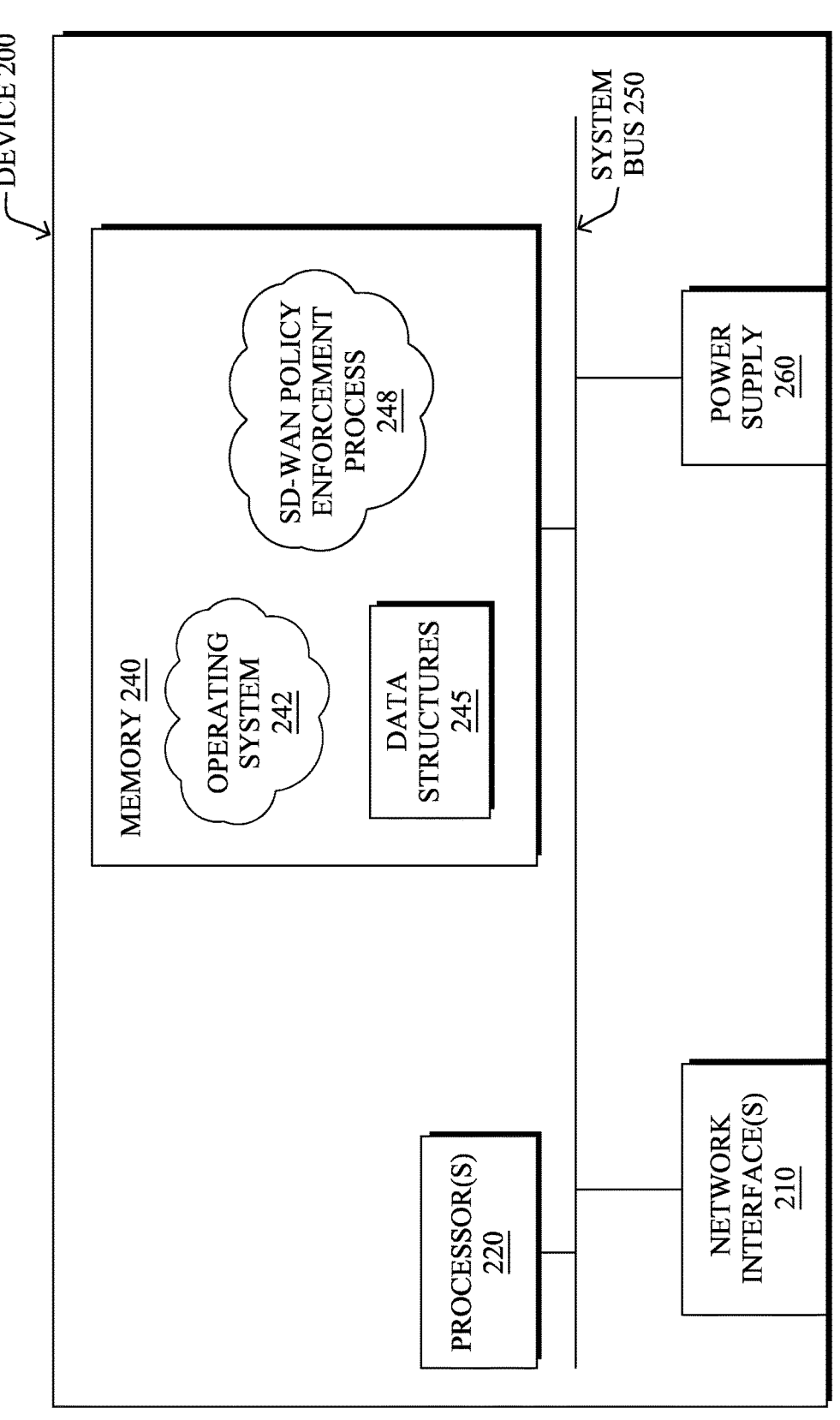
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise an SD-WAN policy enforcement process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

As noted above, the cloud-native paradigm is shifting the way applications are developed, deployed, and operated. Applications are now decomposed into a collection of microservices that interconnect via Layer 7 (L7) protocols, such as via Hypertext Transfer Protocol (HTTP) or HTTP Secure (e.g. HTTPS), and are deployed leveraging infrastructure components such as container orchestrators (e.g. Kubernetes), service meshes (e.g. Istio), and policy enforcement points (e.g. Envoy). This cloud-native infrastructure is meant to enable policy, telemetry, traffic engineering, etc., to optimize the operation of cloud-native applications.

Figure 3:
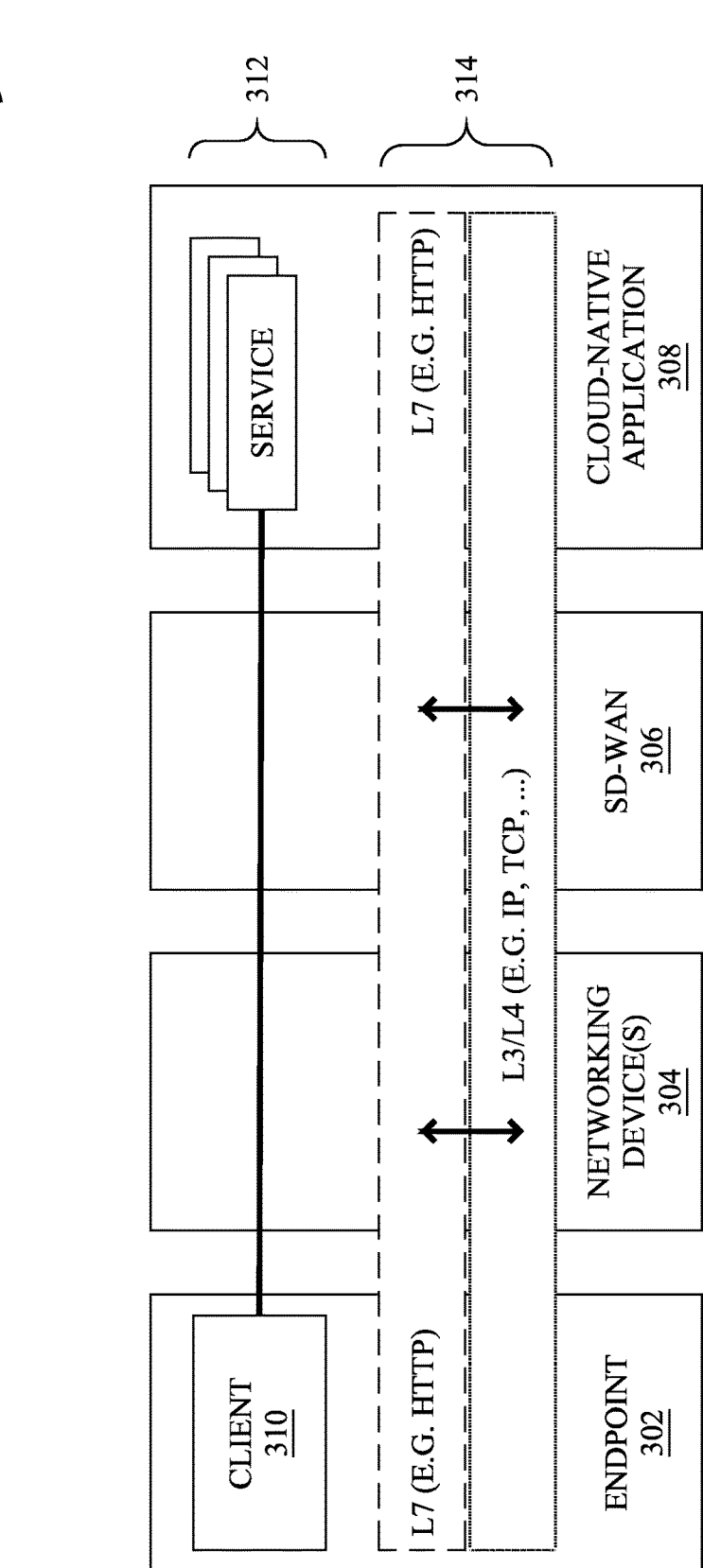
FIG. 3 illustrates an example of a client device accessing a cloud-native application via a software-defined wide area network (SD-WAN)

By way of example, FIG. 3 illustrates an example 300 of an endpoint 302 accessing a cloud-native application 308 via a software-defined wide area network (SD-WAN). As shown, endpoint 302 may execute a client 310 that may leverage an L7 protocol (e.g., HTTP) on top of any suitable L3/L4 protocols (e.g., IP, TCP, etc.) as part of network stack 314, to access cloud-native application 308 via SD-WAN 306. As would be appreciated, access to the SD-WAN by endpoint 302 may be controlled by networking device(s) 304 that resides at the edge of SD-WAN 306 (e.g., one or more routers, etc.). In turn, cloud-native application 308 may be subdivided into any number of microservices/services 312 that communicate back to endpoint 302 via SD-WAN 306.

One of the main forces that is driving the evolution of cloud-native applications into microservices is the increased efficiency in allocating computing resources in both public and hybrid clouds. Containerization, in fact, offers a smaller granularity with which computing resources can be allocated to an application. At the same time, computing resources can be allocated elastically to cloud-native applications, scaling horizontally as the application demands changes over time. This, ultimately, increases the efficiency of resource utilization by the cloud service provider.

Unfortunately, traditional SD-WAN solutions that offers WAN optimization services are struggling to achieve the needed granularity to offer different services to different cloud-native applications. Sometimes, even within the same cloud-native application, different WAN services should be applied to different portion of traffic sent by the same application. Consequently, the benefits that microservices provide in terms of resource utilization at the cloud are often not reflected in the use and allocation of the networking resources used to connect a client device to the application.

Fine-Grained SD-WAN Optimization Services for Cloud-Native Applications

The techniques introduced herein extend SD-WAN services to cloud-native applications by translating cloud-native annotations provided by application developers into a cloud-native policy framework and allowing for policy enforcement at the edges of the SD-WAN.

Specifically, according to various embodiments, a device of a software-defined wide area network (SD-WAN) receives, from a cloud-native application, contextual data for the cloud-native application that identifies microservices of the cloud-native application. The device translates the contextual data for the cloud-native application into a network policy for traffic in the SD-WAN associated with the cloud-native application. The device applies the network policy to a traffic flow in the SD-WAN between an endpoint and a particular microservice of the cloud-native application.

Figure 4:
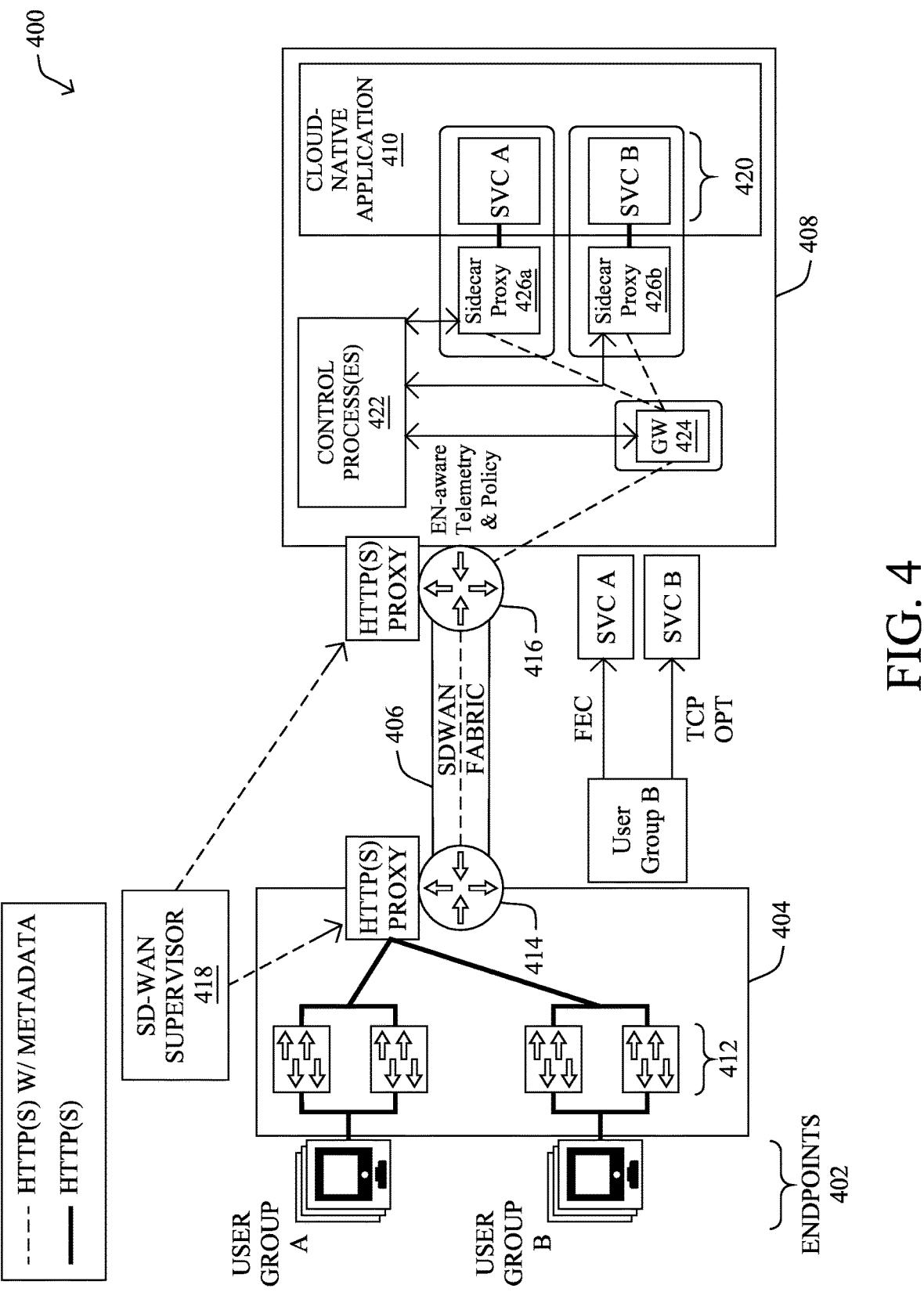
FIG. 4 illustrates an example architecture for using contextual data for fine-grained network optimization for cloud-native application microservices.

Operationally, FIG. 4 illustrates an example architecture 400 for using contextual data for fine-grained network optimization for cloud-native application microservices, according to various embodiments. As shown, architecture 400 may comprise the following components: a plurality of endpoints 402 (e.g., computers, IoT devices, portable electronics, etc.), an SD-WAN access mechanism 404, an SD-WAN fabric 406, and a cloud computing platform 408, which may be hosted in a private or public data center (DC) or comprise a cloud platform as a service (PaaS) or Infrastructure as a Service (IaaS).

In general, SD-WAN access mechanism 404 may comprise any number of switches 412 or other networking equipment (e.g., routers, etc.) that provide connectivity between endpoints 402 and an edge router 414. Notably, SD-WAN access mechanism 404 may take the form of a local area network (LAN) or other network connected to SD-WAN fabric 406 via edge router 414. In some instances, endpoints 402 may be divided into different groups, such as user groups, different groups of endpoints 402 based on their types (e.g., smart thermostats, sensors, user devices, etc.).

An SD-WAN supervisor 418 may provide supervisory control over SD-WAN fabric 406 and oversee its operation. For example, vManage by Cisco Systems, Inc., or another suitable SD-WAN management service, may provide supervisory control over the SD-WAN fabric. Thus, SD-WAN supervisor 418 may be in communication with edge router 414 and a corresponding edge router 416 of cloud computing platform 408, to receive information regarding SD-WAN fabric 406 and provide control over routers 414-416.

Cloud computing platform 408 may host a cloud-native application 410 that comprises any number of microservices 420, such as services SVC A and SVC B shown, to which endpoints 402 seek access via SD-WAN fabric 406. As would be appreciated, cloud computing platform 408 can be implemented in any number of different ways and using any number of different control processes 422. For instance, microservices 420 may be containerized processes executed in separate containers. To this end, control processes 422 may comprise Kubernetes or another suitable container orchestration system that can be used to automate the deployment, scaling, and management of application 410 within cloud computing platform 408.

Another potential control process 422 of cloud computing platform 408 may oversee a policy orchestration framework within cloud computing platform 408. For instance, control process(es) 422 may comprise Istio another suitable policy orchestrator that defines and renders policies within cloud computing platform 408 that may be enforced by way of sidecar proxies 426 bound to a given microservice 420 and/or a gateway (GW) 424 that can enforce policies on inbound and outbound traffic exchanged by the Kubernetes or other container clusters.

To optimize the communications between endpoints 402 and the cloud-native application 410, SD-WAN fabric 406 may also offer a number of optimization services over the SD-WAN such as, but not limited to, a path visibility service, a TCP optimization service, a Forward Error Control (FEC) service, a packet duplication (Pkt Dup) service, a firewall service or other SD-WAN service. Traffic is exchanged with the enterprise network in which endpoints 402 are located, typically a campus or a branch, whose infrastructure provides enterprise specific context, such as the identity or the location of the users and their devices.

According to various embodiments, cloud computing platform 408 may provide contextual data regarding application 410 back to the SD-WAN infrastructure. In some embodiments, this contextual data may identify application 410 and its constituent microservices 420. In further embodiments, the contextual data may also identify the network requirements of each of microservices 420.

The contextual data can be conveyed by either of the following, in various embodiments:

1. Using the control plane of SD-WAN fabric 406. For example, annotations made by the app-devs/cloud-ops at application deployment can be passed via an application programming interface (API) to SD-WAN supervisor 418 as part of a metadata exchange. During such an exchange, SD-WAN supervisor 418 may indicate the various SD-WAN services available to the traffic associated with each of microservices 420.

2. Using the data plane of SD-WAN fabric 406. In this case, the annotations made by the app-devs/cloud-ops at application deployment can be encoded in the traffic sent by application 410 to an endpoint 402, to convey contextual data regarding application 410. If the transport used by application 410 is HTTP-based, the annotations can be encoded in the HTTP header of the traffic, for instance. In this case, edge router 414 may comprise an application level proxy (e.g., an HTTP proxy) configured to extract this contextual data from the data traffic.

In either of the above cases, the SD-WAN infrastructure may translate the provided contextual data regarding application 410 into a (stateless) network policy for the traffic associated with each of microservices 420, according to various embodiments. In turn, policy enforcement can be enacted within SD-WAN fabric 406. For instance, in the case in which edge router 414 extracts the contextual data from the data traffic for application 410, it may either push this data to SD-WAN supervisor 418 so that SD-WAN supervisor 418 can translate it into a policy that router 414 is to enforce. Likewise, in cases in which SD-WAN supervisor 418 obtains the contextual data regarding application 410 via a metadata exchange and/or API, SD-WAN supervisor 418 may translate the contextual data into a network policy and instruct edge router 414 to apply the policy, accordingly.

For example, assume that the contextual data regarding application 410 indicates that the packet duplication service of SD-WAN fabric 406 should be applied to the traffic for each of microservices 420. In such a case, this requirement can be translated into a corresponding policy and enforced within SD-WAN fabric 406. In another example, this mechanism can be used to afford per-microservice granularity when traffic gets exported for visibility/inspection or security enforcement at the gateway through Direct-Internet-Access (DIA). In yet another example, as shown, assume that the network policy specifies that the FEC service should be applied to traffic associated with SVC A in microservices

420, while the TCP Opt service should be applied to traffic associated with SVC B in microservices 420. In such a case, router 414 may enforce the policy, such as when an endpoint 402 in user group B send traffic to application 410.

Figure 5:
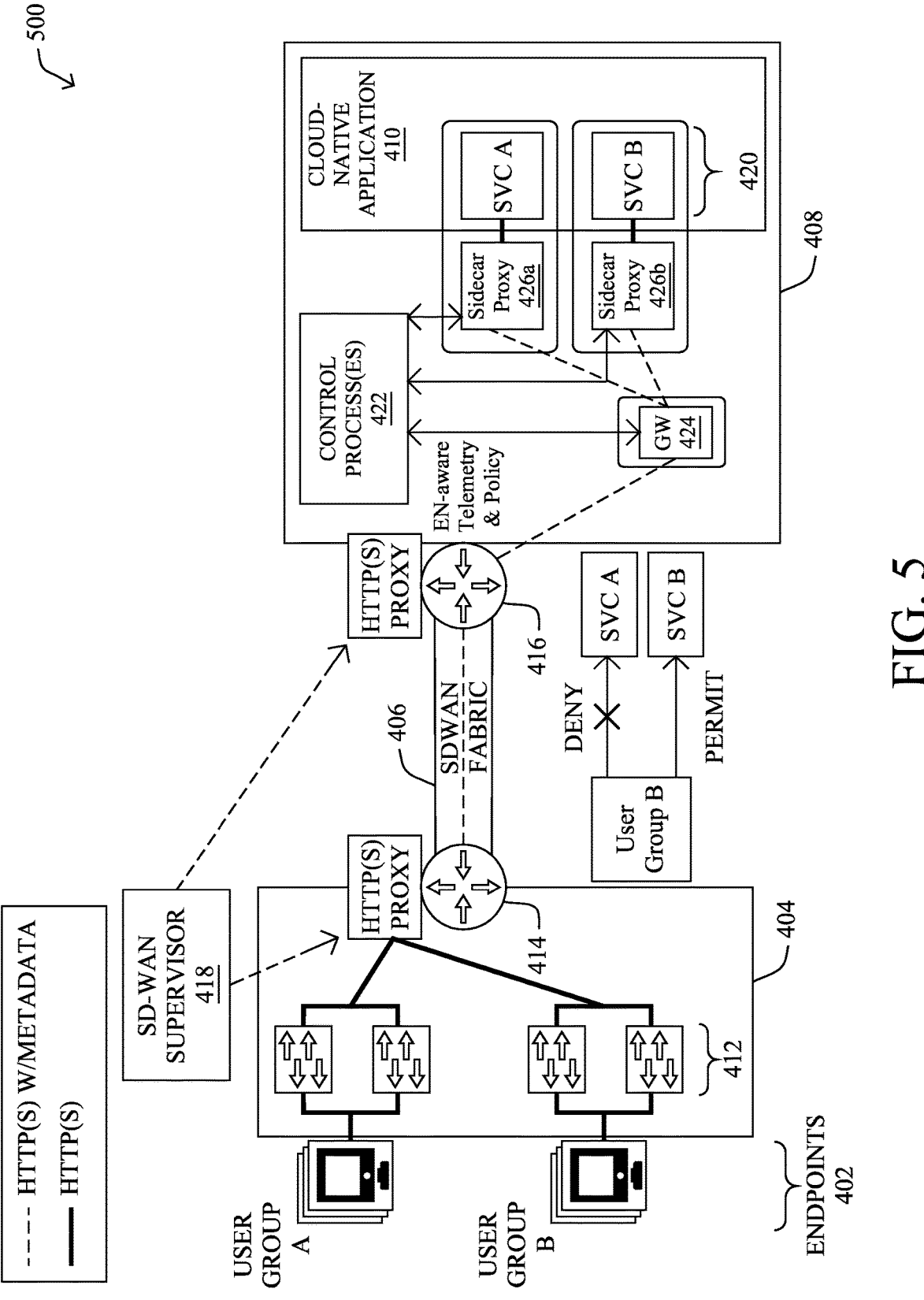

FIG. 5 illustrates another example architecture 500 for providing fine-grained access control for cloud-native application microservices, according to various embodiments. As shown, assume that architecture 500 includes the same components as that of architecture 400 in FIG. 4. For purposes of illustration, assume again that cloud computing platform 408 provides contextual data regarding application 410 to the SD-WAN infrastructure, either via annotation in the data traffic itself (e.g., in an HTTP header) or via an API of SD-WAN supervisor 418, as detailed above.

In various embodiments, the SD-WAN infrastructure may leverage the contextual data regarding application 410 to deliver fine-grained access control of the microservices 420. In other words, this contextual data can be translated into a corresponding network access control policy, using the above techniques, that specifies which of endpoints 402 can access which of microservices 420. In turn, policy enforcement can take place at the edge of SD-WAN fabric 406, such as by edge router 414. For example, the HTTP(S) proxy of edge router 414 may assess the HTTP(S) traffic sent to and/or from endpoints 402 and enforce the access control policies with the granularity of the contextual data regarding application 410 and its constituent microservices 420. Doing so may prevent the use of precious bandwidth and other network and computational resources on-prem in the local network of endpoint 402 (e.g., SD-WAN access mechanism 404, in SD-WAN fabric 406 itself, and/or in the cloud at cloud computing platform 408.

By way of example, as shown, assume that the access control policy specifies that endpoints 402 in user group B are permitted to access microservice SVC B in microservices 420, but should be denied access to microservice SVC A in microservices 420. In such a case, edge router 414 may evaluate the traffic sent by endpoints 402 and, if any of these conditions are met, enact the corresponding enforcement action. For instance, edge router 414 may block traffic sent by endpoints 402 in user group B from accessing SVC A, while permitting traffic sent by those same endpoints 402 to SVC B.

FIG. 6 illustrates an example architecture 600 for passing contextual data to an SD-WAN, according to various embodiments. Similar to architecture 500 in FIG. 6, assume that architecture 600 comprises many of the same components of architecture 400, but that cloud computing platform 408 hosts microservices 612 for different applications, denoted App A and App B in FIG. 6.

During execution, control process(es) 422 of cloud computing platform 408 may function together to capture annotations 608*a*-608*b* regarding the respective microservices 612 and their corresponding applications, in various embodiments. Such annotations 608 may take the form of YAML data or other suitable format and may be specified by the developers of App A and App B, respectively, or specified by cloud operations personnel of cloud computing platform 408. In one embodiment, control process(es) 422 may include Istio. In such a case, the ingress gateway (GW) 424 may operate in conjunction with (HTTPS) proxies 426*a*-426*b* to obtain the annotations 608*a*-608*b*.

In turn, control process(es) 422 may provide annotations 608*a*-608*b* to SD-WAN supervisor 418, which translates annotations 608*a*-608*b* into corresponding network policies to be implemented by edge router 414 and/or edge router 416. By way of example, assume that annotation 608*a* specifies the following:

> annotation:cnwan.cisco.com/max-latency=40 ms while annotation 608*b* specifies the following:

> annotation:cnwan.cisco.com/traffic-profile=video

In such cases, SD-WAN supervisor 418 may interpret annotations 608*a*-608*b* as specifying that traffic in SD-WAN fabric 406 associated with App A requires low latency, while traffic in SD-WAN fabric 406 associated with App B, which is a video application and, thus, requires high throughput.

Based on the requirements of microservices 612 and their corresponding applications, SD-WAN supervisor 418 may determine that a low latency path exists in SD-WAN fabric 406 for destination address IP_A2, while a high throughput path exists in SD-WAN fabric 406 for destination address IP_B2. Of course, both of these addresses may be externally facing SD-WAN fabric 406 and edge router 416 may be addressed internally within cloud computing platform 408 at IP_K. Likewise, these paths may be associated with addresses IP_A1 and IP_B1 at edge router 414, respectively, with an internally facing address of IP_E. This allows SD-WAN supervisor 418 to push a network policy to edge router 414 as follows:

> AppA→dst IP=IP_A2

> AppB→dst IP=IP_B2

Consequently, when a particular endpoint 402*a* sends application traffic for App A to IP_E of edge router 414, edge router 414 may enforce the network policy from SD-WAN supervisor 418 by opting to send the traffic via IP_A1 to destination address IP_A2 of edge router 416, so that the traffic is sent via the low latency path in SD-WAN fabric 406. Similarly, when endpoint 402*a* sends application traffic for App B to IP_E of edge router 414, edge router 414 may opt to send the traffic via IP_B1 to destination address IP_B2 of edge router 416, so that the traffic is sent via the high throughput path in SD-WAN fabric 406.

In some embodiments, the traffic for the applications may be HTTP(S) traffic and edge router 414 may enforce the network policy from SD-WAN supervisor 418 through the use of HTTP(S) proxy 602. In such a case, the policy may account for the two different microservices applications being behind the same ingress gateway but having different HTTP paths, as follows:

> https://example.net/AppA→dst IP=IP_A2

> https://example.net/AppB→dst IP=IP_B2

A similar HTTP(S) proxy 604 of edge router 416 may perform a similar function.

Said differently, edge router 414 may perform its policy enforcement on any number of different forms of traffic (e.g., traffic using different protocols, etc.), according to various embodiments. In the case of HTTP(S) traffic, this enforcement may be performed through the use of an HTTP(S) proxy, in some embodiments. In other embodiments, however, such a proxy is not needed to perform the enforcement with respect to the other forms of traffic.

In closing, FIG. 7 illustrates an example simplified procedure for translating contextual data for a cloud-native application into a network policy, in accordance with one or more embodiments described herein, particularly from the perspective of a device that executes an application to be monitored. For example, a non-generic, specifically configured device (e.g., device 200) of an SD-WAN (e.g., a router, a controller, etc.) may perform procedure 700 by executing stored instructions (e.g., process 248). The procedure 700 may start at step 705, and continues to step 710, where, as described in greater detail above, the device may receive, from a cloud-native application, contextual data for the cloud-native application that identifies microservices of the cloud-native application. In some instances, the contextual data may also indicate the network requirements of traffic associated with a given one of the microservices. For instance, the contextual data may indicate that traffic in the SD-WAN associated with microservice A of the application should be processed using one or more SD-WAN services, such as a path visibility service, a firewall service, or the like.

At step 715, as detailed above, the device of the SD-WAN may translate the contextual data for the cloud-native application into a network policy for traffic in the SD-WAN associated with the cloud-native application. In some embodiments, the network policy may comprise an access policy for a particular one of the microservices of the cloud-native application. For instance, the access policy may a certain endpoint or user group of the SD-WAN from accessing that microservice. In further embodiments, the network policy may specify one or more SD-WAN services to apply to traffic associated with that microservice.

At step 720, the device may apply the network policy to a traffic flow in the SD-WAN between an endpoint and a particular microservice of the cloud-native application, as described in greater detail above. For instance, if the device is a router in the SD-WAN, it may block traffic from the endpoint to the microservice, according to an access policy, or subject the traffic to any number of SD-WAN services. In further instances, such as when the device is an SD-WAN controller, it may apply the policy by sending the policy to one or more enforcement points in the SD-WAN, such as one or more routers. Procedure 700 then ends at step 725.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

According to the embodiments, herein, a method herein may comprise receiving, at a device of a software-defined wide area network (SD-WAN) and from a cloud-native application, contextual data for the cloud-native application that identifies microservices of the cloud-native application. The method also may comprise translating, by the device, the contextual data for the cloud-native application into a network policy for traffic in the SD-WAN associated with the cloud-native application. The method may further comprise applying, by the device, the network policy to a traffic flow in the SD-WAN between an endpoint and a particular microservice of the cloud-native application.

In one embodiment, the network policy of the method may comprise an access policy for the particular microservice. In addition, apply the network policy to the traffic flow may comprise preventing the endpoint from accessing the particular microservice of the cloud-native application. In another embodiment, the access policy for the particular microservice may specify a user group to which the endpoint belongs. In a further embodiment, the contextual data for the cloud-native application may be translated into the network policy for traffic in the SD-WAN associated with the cloud-native application by selecting one or more SD-WAN services to be applied to traffic in the SD-WAN associated with the particular microservice. In a further embodiment, the one or more SD-WAN services may comprise at least one of: a path visibility service, a Transport Control Protocol (TCP) optimization service, a Forward Error Control (FEC) service, a packet duplication service, or a firewall service. In yet another embodiment, receiving the contextual data for the cloud-native application that identifies microservices of the cloud-native application may comprise extracting the contextual data from a Hypertext Transfer Protocol (HTTP) header of traffic sent by the cloud-native application. In another embodiment, receiving the contextual data for the cloud-native application that identifies microservices of the cloud-native application may comprise receiving the contextual data via an application programming interface (API). In an additional embodiment, the device of the SD-WAN may comprise a router. In yet another embodiment, applying the network policy to a traffic flow in the SD-WAN between the endpoint and the particular microservice of the cloud-native application may comprise selecting a path for the traffic flow in the SD-WAN based on one or more performance characteristics of the path (e.g., latency, throughput, jitter, etc.).

According to the embodiments herein, an apparatus herein may comprise one or more network interfaces to communicate with a software-defined wide area network (SD-WAN); a processor coupled to the one or more network interfaces and configured to execute one or more processes; and a memory configured to store a process that is executable by the processor. When executed, the process is configured to receive, from a cloud-native application, contextual data for the cloud-native application that identifies microservices of the cloud-native application. When executed, the process is also configured to translate the contextual data for the cloud-native application into a network policy for traffic in the SD-WAN associated with the cloud-native application. The process is further configured to apply the network policy to a traffic flow in the SD-WAN between an endpoint and a particular microservice of the cloud-native application, when executed.

Further, according to the embodiments herein, a tangible, non-transitory, computer-readable medium may store program instructions that cause a device of a software-defined wide area network (SD-WAN) to execute a process. The process may comprise receiving, at the device and from a cloud-native application, contextual data for the cloud-native application that identifies microservices of the cloud-native application. The process may also comprise translating, by the device, the contextual data for the cloud-native application into a network policy for traffic in the SD-WAN associated with the cloud-native application. The process may further comprise applying, by the device, the network policy to a traffic flow in the SD-WAN between an endpoint and a particular microservice of the cloud-native application.

The techniques described herein, therefore, allow for different network policies to be implemented in an SD-WAN on a per-microservice basis. In some aspects, contextual data can be provided by a cloud-native application regarding its microservices. Such contextual data can be signaled either directly within the data traffic (e.g., as part of an HTTP header) or via an API or other interface of the SD-WAN controller. This contextual data allows the SD-WAN to optimize traffic to and from a given microservice of the cloud-native application, such as by applying different network services to the traffic. In further aspects, security policies can be applied to the traffic, so as to prevent certain endpoints from accessing certain microservices of the application. Said differently, the techniques herein allow for the optimal routing of traffic belonging to cloud-native applications between sites and the cloud, as well as between clouds, via an SD-WAN. In addition, the techniques herein allow for the fine-grained enforcement of selected SD-WAN configurations, features, and/or service level agreement (SLA) requirements at the edge of the SD-WAN for traffic associated with cloud-native applications.

Illustratively, the techniques described herein may be performed by hardware, software, and/or firmware, such as in accordance with the SD-WAN policy enforcement process 248, or another process, which may include computer executable instructions executed by the processor 220 (or independent processor of interfaces 210) to perform functions relating to the techniques described herein.

While there have been shown and described illustrative embodiments that provide for fine-grained SD-WAN optimization services for cloud-native applications, it is to be understood that various other adaptations and modifications may be made within the spirit and scope of the embodiments herein. For example, while certain embodiments are described herein with respect to using certain protocols, other suitable protocols may be used, accordingly.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller", those skilled in the art will appreciate that any process step performed "by a server" need not be limited to local processing on a specific server device, unless otherwise specifically noted as such. Furthermore, while certain aspects are described as being performed by an agent or by particular types of agents (e.g., application agents, network agents, etc.), the techniques may be generally applied to any suitable software/hardware configuration (libraries, modules, etc.) as part of an apparatus or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

receiving, at a device of a software-defined wide area network (SD-WAN) and from a cloud-native application, contextual data for the cloud-native application that identifies microservices of the cloud-native application;

identifying, by the device, network requirements for each of the microservices specified in the contextual data for the cloud-native application;

translating, by the device and based on the network requirements identified for each of the microservices, the contextual data for the cloud-native application into a network policy for traffic in the SD-WAN associated with the microservices, wherein the network policy comprises a plurality of corresponding access policies for each of the microservices; and applying, by the device, an access policy from the plurality of corresponding access policies to a traffic flow in the SD-WAN between an endpoint and particular microservice of the microservices.

2. The method as in claim 1, wherein applying the access policy to the traffic flow comprises:

preventing the endpoint from accessing the particular microservice of the cloud-native application.

3. The method as in claim 2, wherein the access policy for the particular microservice specifies a user group to which the endpoint belongs.

4. The method as in claim 1, wherein the contextual data specifies one or more SD-WAN services to be applied to traffic in the SD-WAN associated with the particular microservice.

5. The method as in claim 4, wherein the one or more SD-WAN services comprise at least one of: a path visibility service, a Transport Control Protocol (TCP) optimization service, a Forward Error Control (FEC) service, a packet duplication service, or a firewall service.

6. The method as in claim 4, wherein application of the network policy causes the one or more SD-WAN services specified in the contextual data to be applied to the traffic flow between the endpoint and the particular microservice.

7. The method as in claim 1, wherein receiving the contextual data for the cloud-native application that identifies microservices of the cloud-native application comprises:

extracting the contextual data from a Hypertext Transfer Protocol (HTTP) header of traffic sent by the cloud-native application.

8. The method as in claim 1, wherein receiving the contextual data for the cloud-native application that identifies microservices of the cloud-native application comprises:

receiving the contextual data via an application programming interface (API).

9. The method as in claim 1, wherein the device is an edge router in the SD-WAN.

10. The method as in claim 9, wherein the edge router extracts the contextual data from data traffic for the cloud-native application.

11. An apparatus, comprising:

one or more network interfaces to communicate with a software-defined wide area network (SD-WAN);

a processor coupled to the one or more network interfaces and configured to execute one or more processes; and a memory configured to store a process that is executable by the processor, the process when executed configured to:

receive, from a cloud-native application, contextual data for the cloud-native application that identifies microservices of the cloud-native application;

identify network requirements for each of the microservices specified in the contextual data for the cloud-native application;

translate, based on the network requirements identified for each of the microservices, the contextual data for the cloud-native application into a network policy for traffic in the SD-WAN associated with the microservices, wherein the network policy comprises a plurality of corresponding access policies for each of the microservices; and applying, by the device, an access policy from the plurality of corresponding access policies to a traffic flow in the SD-WAN between an endpoint and particular microservice of the microservices.

12. The apparatus as in claim 11, wherein the apparatus applies the network policy to the traffic flow by:

preventing the endpoint from accessing the particular microservice of the cloud-native application.

13. The apparatus as in claim 12, wherein the access policy for the particular microservice specifies a user group to which the endpoint belongs.

14. The apparatus as in claim 11, wherein the contextual data specifies one or more SD-WAN services to be applied to traffic in the SD-WAN associated with the particular microservice.

15. The apparatus as in claim 14, wherein the one or more SD-WAN services comprise at least one of: a path visibility service, a Transport Control Protocol (TCP) optimization service, a Forward Error Control (FEC) service, a packet duplication service, or a firewall service.

16. The apparatus as in claim 14, wherein application of the network policy causes the one or more SD-WAN services specified in the contextual data to be applied to the traffic flow between the endpoint and the particular microservice.

17. The apparatus as in claim 11, wherein the apparatus receives the contextual data for the cloud-native application that identifies microservices of the cloud-native application by:

extracting the contextual data from a Hypertext Transfer Protocol (HTTP) header of traffic sent by the cloud-native application.

18. The apparatus as in claim 11, wherein the apparatus receives the contextual data for the cloud-native application that identifies microservices of the cloud-native application by:

receiving the contextual data via an application programming interface (API).

19. The apparatus as in claim 11, wherein the apparatus is an edge router in the SD-WAN.

20. A tangible, non-transitory, computer-readable medium storing program instructions that cause a device of a software-defined wide area network (SD-WAN) to execute a process comprising:

receiving, at the device and from a cloud-native application, contextual data for the cloud-native application that identifies microservices of the cloud-native application;

identifying, by the device, network requirements for each of the microservices specified in the contextual data for the cloud-native application;

translating, by the device and based on the network requirements identified for each of the microservices, the contextual data for the cloud-native application into a network policy for traffic in the SD-WAN associated with the microservices, wherein the network policy comprises a plurality of corresponding access policies for each of the microservices; and applying, by the device, an access policy from the plurality of corresponding access policies to a traffic flow in the SD-WAN between an endpoint and particular microservice of the microservices.

* * * * *